Nov. 29, 1927.

F. F. HILDEBRANDT

FASTENER

Filed April 5, 1927

1,650,715

Inventor

Frank F. Hildebrandt.

By Cullman, Bryant Warby
Attorneys

Patented Nov. 29, 1927.

1,650,715

UNITED STATES PATENT OFFICE.

FRANK F. HILDEBRANDT, OF ALTOONA, PENNSYLVANIA.

FASTENER.

Application filed April 5, 1927. Serial No. 181,170.

The present invention relates to fasteners, and specifically to double end fasteners particularly adapted to connect the cross chains of anti-skid chains to the circular tie chains. The fastener is so designed as to be quickly removable so that spares may be substituted for worn or broken cross chains.

Figure 1:
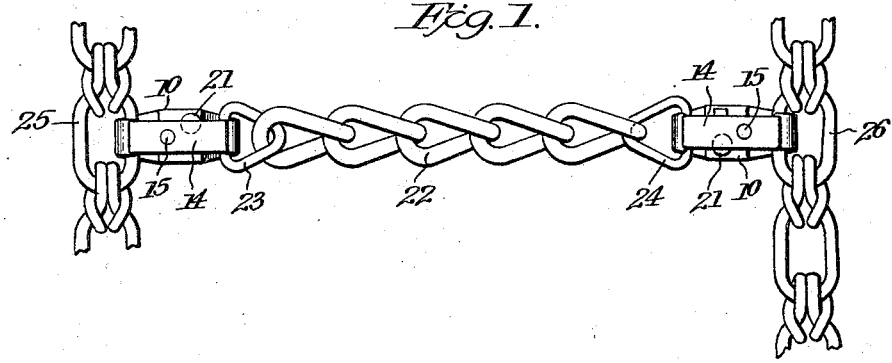
Figure 1 is a plan view of a cross and tie chain assembly showing my improved fasteners interposed between each end of the cross chain and respective tie chain sections.
Figure 2:
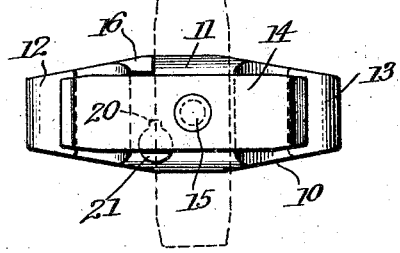
Figure 2 is a top plan view of the fastener.
Figure 4:
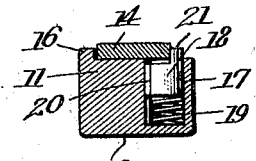
Figure 4 is a section on the line 4—4 of Figure 3.
Figure 3:
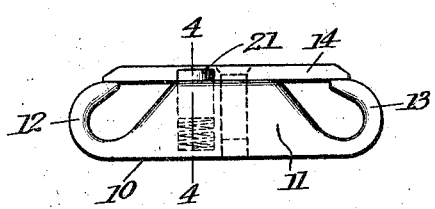
Figure 3 is a side elevation of the same.

The fastener as here shown, comprises a body member 10 having a central boss or expanded portion 11 and hook ends 12 and 13 lying within the top and bottom bounding planes of the boss. A latch 14 is pivoted to boss 11 by means of a rivet or bolt 15 and is adapted to swing across the hook ends to close them or to uncover these ends as indicated in dotted lines in Figure 2. One corner of the boss is provided with an upstanding fixed lug 16, and this lug is so positioned relative to latch 14 that it will prevent the latter from swinging beyond its closed position or away from its closed position by more than 90°, although this angle of permissible swing may, of course, be varied to some extent.

Boss 11 is provided with a bore 17 parallel to the axis of rivet 15 and on the same side of the latter as lug 16. Generally speaking, bore 17, lug 16 and rivet 15 are at the apices of a triangle. A detent 18 is positioned in bore 17 and is normally forced outwardly by a compression spring 19. Detent 18 is preferably of circular cross section, and if desired, may be provided with a feather 20 mating with a groove in the wall of the bore. The crown of the detent is provided with a segmental lug 21. The detent 18 will, of course, be positioned in the bore before latch 14 is attached to the body member and the width of the latch is such in relation to its swinging range that it will never completely uncover bore 17, thus maintaining the detent securely within the bore for limited longitudinal movement therein at all times.

When the parts are in the position shown, that is, in closed relation, segmental lug 21 takes behind latch member 14 and prevents its opening while as explained above lug 16 prevents movement of the latch beyond the closed position. When the fastener is to be opened, detent 18 is pressed inwardly until lug 21 passes below the lower plane of latch 14, whereupon the latter may be swung over it into the dotted line position of Figure 2. In this position, latch 14 covers at least a segment of bore 17 so that the detent is maintained in depressed position with no danger of escaping from its seat.

In practice, I provide each end of cross chain 22 with a triangular link 23 and 24 and a fastener as described is engaged with each of these end links and with links 25 and 26 of the tie chain.

While I have described a specific embodiment of my invention, it is apparent that variations of structure are possible and I do not intend to limit my invention except in accordance with the terms of the following claims.

I claim:

1. A fastener comprising a pair of laterally spaced elongated members pivotally connected for relative swinging in parallel planes, one of said members having an expanded portion approaching the other member adjacent the pivot point, a hook on one of said members extending in the axial direction of the pivotal connection and adapted to be closed by the other member, and a yieldable detent mounted in said expanded portion and engaging the other member to prevent a relative swinging of the two members from such parallel relation.

2. A fastener comprising a pair of laterally spaced elongated members pivotally connected for relative swinging in parallel planes, a hook on one of said members closed by the other when they are in parallel relation, said hook extending in the axial direction of the pivotal connection, a yieldable detent carried by one of said members and engaging the other to prevent a relative swinging of the two in one direction from such parallel relation, and a fixed detent to prevent such swinging in the other direction.

3. A fastener comprising a pair of laterally spaced elongated members pivotally connected for relative swinging in parallel planes, one of said members having an expanded portion approaching the other member adjacent the pivot point, a hook on one of said members closed by the other when they are in parallel relation, said hook extending in the axial direction of the pivotal connection, a yieldable detent mounted in said expanded portion and engaging the other member to prevent a relative swinging of the two members in one direction from such parallel relation, and a fixed detent on said expanded portion to prevent such swinging in the other direction.

4. A fastener comprising a body member having a central boss and hook ends, a latch member pivoted to said boss and adapted when in parallel relation to said body member to close said hook end, a releasable detent set in said boss and adapted to engage one side of said latch member, and a fixed detent engaging said latch member at another point when it is in such parallel relation whereby relative swinging of the two members is prevented.

5. A fastener comprising a body member having a boss and a hook end, a latch member pivoted to said boss and adapted to swing across said hook end to close it, a spring pressed detent in the swinging path of said latch member, and a fixed detent on said boss to prevent said latch from entirely passing off of said spring pressed detent in either swinging direction, said spring pressed detent being adapted to positively engage said latch member when the latter is in closed position.

6. A fastener comprising a body member having a boss and a hook end, a latch member pivoted to said boss and adapted to swing across said hook end to close it, a spring pressed detent in the swinging path of said latch member, and a fixed detent on said boss to prevent said latch from entirely passing off of said detent in either swinging direction, said detent having a segmental lug on its crown adapted to engage behind said latch member when it is in closed position.

7. A fastener comprising a body member having a central boss and hook ends, a latch member pivoted to said boss and adapted to swing across the plane of said hook ends to close the latter, a spring pressed detent seated in a bore in said boss in the swinging path of said latch member, and a fixed detent on said boss to prevent said latch from entirely passing off of said detent in either swinging direction, said detent having a segmental lug on its crown adapted to engage behind said latch member when it is in closed position.

8. A fastener comprising a body member having a central boss and hook ends, a latch member pivoted to said boss and adapted to swing across the plane of said hook ends to close the latter, a spring pressed detent seated in a bore in said boss within the swinging path of said latch member, and a fixed lug on said boss to determine the swing of said latch member, said detents and the pivot point of said latch member being in triangular relation.

In testimony whereof I have hereunto set my hand.

FRANK F. HILDEBRANDT.